(12) United States Patent
Chu et al.

(10) Patent No.: US 11,709,133 B2
(45) Date of Patent: *Jul. 25, 2023

(54) SOLID SURFACE WETTABILITY DETERMINATION METHOD

(71) Applicant: INDUSTRIAL TECHNOLOGY RESEARCH INSTITUTE, Hsinchu (TW)

(72) Inventors: Jen-You Chu, Hsinchu (TW);
Yun-Hsin Wang, Kaohsiung (TW);
Feng-Sheng Kao, Hsinchu (TW);
Siou-Cheng Lou, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 240 days.

This patent is subject to a terminal disclaimer.

(21) Appl. No.: 17/243,468

(22) Filed: Apr. 28, 2021

(65) Prior Publication Data

US 2021/0247310 A1 Aug. 12, 2021

Related U.S. Application Data

(63) Continuation-in-part of application No. 16/586,490, filed on Sep. 27, 2019, now Pat. No. 11,326,997.
(Continued)

(51) Int. Cl.
*G01N 21/55* (2014.01)
*G01N 1/28* (2006.01)

(52) U.S. Cl.
CPC ............... *G01N 21/55* (2013.01); *G01N 1/28* (2013.01); *G01N 2201/06113* (2013.01)

(58) Field of Classification Search
CPC ...... G01N 13/02; G01N 21/552; G01N 21/55; G01N 21/94
(Continued)

(56) References Cited

U.S. PATENT DOCUMENTS 4,199,261 A * 4/1980 Tidd ....................... G01N 21/55
356/448
4,585,348 A * 4/1986 Chastang ............. G01N 21/211
356/369

(Continued)

FOREIGN PATENT DOCUMENTS

CN 101688835 A 3/2010
CN 102183297 A 9/2011
(Continued)

OTHER PUBLICATIONS

TW Office Action dated May 12, 2022 as received in Application No. 110115399.
(Continued)

*Primary Examiner* — Isiaka O Akanbi
(74) *Attorney, Agent, or Firm* — Maschoff Brennan (57) ABSTRACT

A solid surface wettability determination method is disclosed. A liquid is sprayed on a surface of an object. A light beam is projected toward the surface, wherein the light beam is reflected by the liquid on the surface to generate a reflected light. The reflected light is received by an optical detector, and the optical detector outputs a determining signal related to a wettability of the surface according to the reflected light. A corresponding signal-angle relation is selected from a database according to type of the liquid and material of the object. The contact angle of the liquid on the surface is obtained by applying the determining signal to the corresponding signal-angle relation.

10 Claims, 7 Drawing Sheets

Related U.S. Application Data (60) Provisional application No. 62/738,266, filed on Sep. 28, 2018.

(58) Field of Classification Search
USPC .................. 356/445–448, 237.1–237.6, 72
See application file for complete search history.

(56) References Cited

U.S. PATENT DOCUMENTS

| | | | |
|---|---|---|---|
| 5,080,484 A | 1/1992 | Schneider et al. | |
| 5,329,357 A | 7/1994 | Bernoux et al. | |
| 5,333,052 A * | 7/1994 | Finarov ................ | G01N 21/88 356/369 |
| 5,708,278 A | 1/1998 | Lowne | |
| 5,717,485 A | 2/1998 | Ito et al. | |
| 7,369,233 B2 | 5/2008 | Nikoonahad et al. | |
| 8,269,968 B2 | 9/2012 | Brochard et al. | |
| 2003/0128371 A1* | 7/2003 | Vaux .................... | G01N 13/02 356/601 |
| 2006/0163458 A1 | 7/2006 | Reime | |
| 2007/0122551 A1 | 5/2007 | Yamamoto et al. | |
| 2010/0024529 A1* | 2/2010 | Dillingham ........... | G01N 13/02 73/64.52 |
| 2010/0045984 A1 | 2/2010 | Brochard et al. | |
| 2010/0328654 A1 | 12/2010 | Verschuren et al. | |
| 2011/0109910 A1 | 5/2011 | Georgakoudi et al. | |
| 2017/0052022 A1 | 2/2017 | Hung | |
| 2017/0228882 A1* | 8/2017 | Dillingham ........... | G01N 13/02 |
| 2017/0307536 A1 | 10/2017 | Dillingham et al. | |
| 2020/0072598 A1 | 3/2020 | Hsu et al. | |

FOREIGN PATENT DOCUMENTS

| | | |
|---|---|---|
| CN | 102271976 A | 12/2011 |
| CN | 104949939 A | 9/2015 |
| CN | 106468535 A | 3/2017 |
| CN | 106501134 A | 3/2017 |
| CN | 107923928 A | 4/2018 |
| CN | 110451454 A | 11/2019 |
| CN | 111272791 A | 6/2020 |
| DE | 2053390 A1 | 5/1972 |
| EP | 1893974 A1 | 3/2008 |
| JP | H0656763 U | 8/1994 |
| JP | 2000018926 A | 1/2000 |
| JP | 4488910 B2 | 6/2010 |
| JP | 5418941 B2 | 2/2014 |
| JP | 2016217784 A | 12/2016 |
| WO | 03/036269 A1 | 5/2003 |
| WO | 2006/131568 A1 | 12/2006 |

OTHER PUBLICATIONS

Taiwan Office Action dated Jul. 9, 2021 as received in application No. 108135328.
Chinese Office Action dated Jul. 5, 2022 as received in Application No. 201910931830.9.
Chinese Office Action dated Dec. 29, 2021 as received in application No. 201910931830.9.
Yu et al., "Nanotechnology and Nano-textiles" 2011.
Huang et al., "Wetting Transition and Stability Testing of Superhydrophobic State" 2013.
Sakai et al., "Effect of Surface Structure on the Sustainability of an Air Layer on Superhydrophobic Coatings in a Water-Ethanol Mixture" 2009.
Taiwan Office Action dated Oct. 8, 2021 as received in application No. 108135328.
Chinese Office Action dated Apr. 28, 2023 as received in application No. 201910931830.9.

* cited by examiner

SOLID SURFACE WETTABILITY DETERMINATION METHOD

CROSS-REFERENCE TO RELATED APPLICATIONS

This application is a continuation-in-part application of earlier non-provisional application No(s). 16/586,490 filed on Sep. 27, 2019, which claims priority under 35 U.S.C. § 119(a) on Patent Application No(s). 62/738,266 filed in U.S. on Sep. 28, 2018, the entire contents of which are hereby incorporated by reference.

BACKGROUND

1. Technical Field

This present disclosure relates to a solid surface wettability determination system and a solid surface wettability determination method.

2. Related Art

Surface wettability usually depends on the chemical composition or the profile on the surface. Currently, the surface wettability can be changed through chemical or physical surface modifications. For example, for shoe making, after an insole or an outsole is manufactured, its surface is treated by oxygen plasma to become highly hydrophilic, in order to facilitate the sole attaching with environmental friendly water glue. It is necessary to detect the surface wettability of the sole in order to confirm whether the surface modification is in good condition.

In a conventional method, the solid surface wettability is determined according to the contact angle of liquid on the surface. The liquid is provided on the surface, and an image of a lateral side of the liquid is captured to measure the contact angle, thereby determining the solid surface wettability through the contact angle. Another alternative method to detected solid surface wettability is based on fluorescence, which hydrophilic group on the surface could be excited by UV light. The amount of chemical substances on the surface is inferred from the measured fluorescence intensity, and thus determining the wettability.

SUMMARY

According to one embodiment of the present disclosure, a solid surface wettability determination method includes the steps of: spraying a liquid on a solid surface of an object; projecting a light beam toward the surface, wherein the light beam is reflected by the liquid on the solid surface to generate a reflected light; receiving the reflected light by an optical detector, and outputting a determining signal related to a wettability of the solid surface according to the reflected light; selecting a corresponding signal-angle relation from a database according to type of the liquid and material of the object; and obtaining a contact angle of the liquid on the solid surface by applying the determining signal to the corresponding signal-angle relation.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
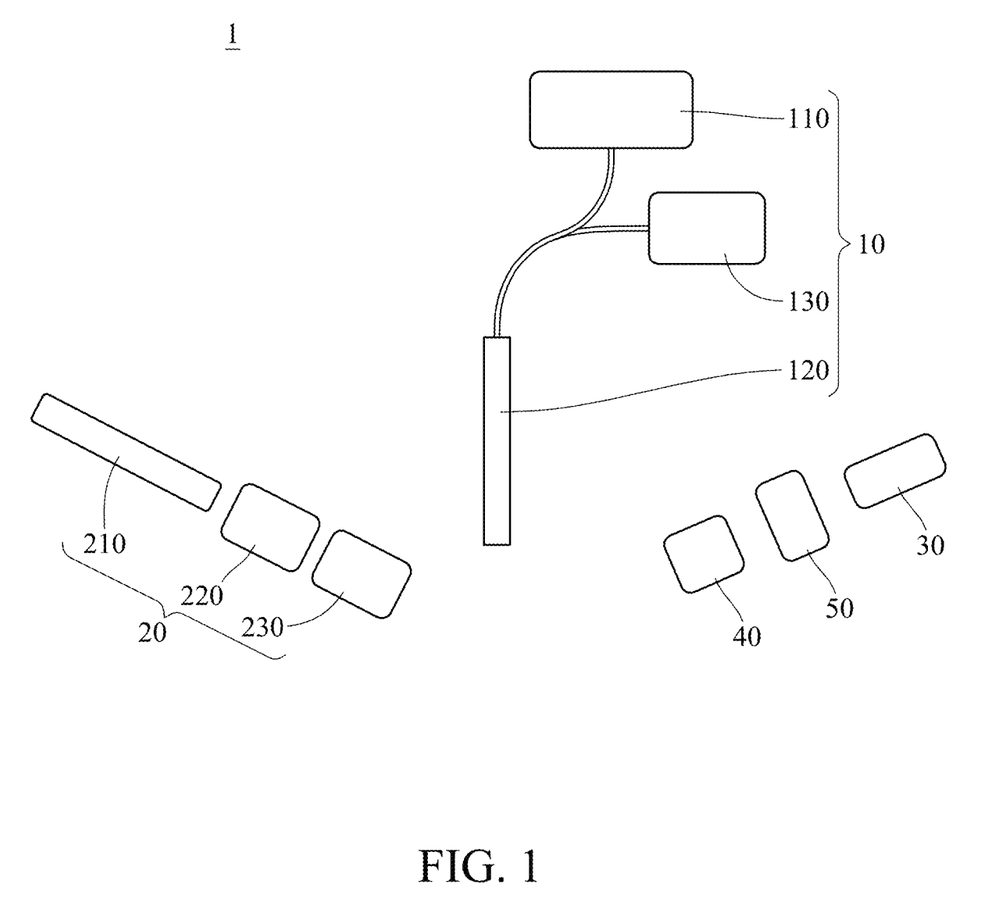
FIG. 1 is a schematic view of a system for performing solid surface wettability determination method according to one embodiment of the present disclosure.

Please refer to FIG. 1, which is a schematic view of a system for performing solid surface wettability determination method according to one embodiment of the present disclosure. According to one embodiment, a solid surface wettability determination system 1 includes a sprayer 10, a light emission device 20 and an optical detector 30.

The sprayer 10 includes a container 110, a spray nozzle 120 and a pump 130. The container 110 is provided for storing liquid such as water, ethanol and silicone oil. The spray nozzle 120 is communicated with the container 110, and the pump 130 is disposed between the container 110 and the spray nozzle 120. The pump 130 moves liquid from the container 110 and deliver liquid to the spray nozzle 120. In this embodiment, the spray nozzle 120 can include single-phase spray nozzle, two-phase spray nozzle or ultrasonic spray nozzle.

The light emission device 20 includes a light emitting component 210, a beam shaper 220 and a polarizer 230. The light emitting component 210, for example but not limited to, is a laser emitter, a light emitting diode, a halogen lamp or a mercury vapor lamp for emitting a light beam 211. The beam shaper 220, for example but not limited to, is an optical element for adjusting the diameter of the light beam 211 and collimating the light beam 211. The polarizer 230, for example but not limited to, is a sheet for filtering the light beam 211 passing through the light emission device 20 into a beam of single polarization.

The optical detector 30, for example, is a photovoltaic detector, a photo-thermoelectric detector, an optical meter, a charge coupled device (CCD) or a complementary metal-oxide-semiconductor (CMOS) for detecting light and converting light intensity into digital signal.

In this embodiment, the solid surface wettability determination system 1 further includes an analyzer 40 and an optical lens 50 which are disposed to correspond to the optical detector 30. The analyzer 40 is provided for filtering the light beam 211 entering into the optical detector 30 to ensure that the optical detector 30 receives light with single polarization. The optical lens 50 is provided for converging the light beam 211 approaching the optical detector 30.

Figure 2:
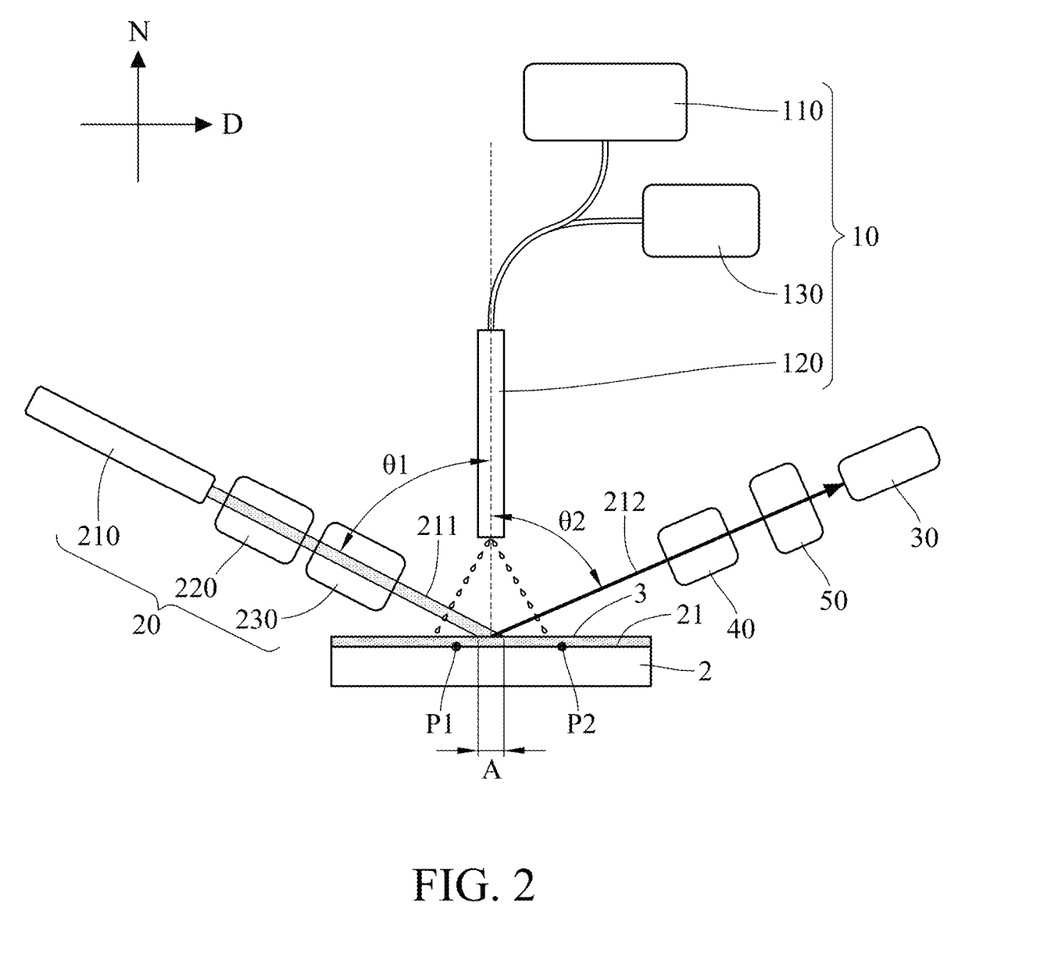
FIG. 2 is a schematic view of detecting an object by the solid surface wettability determination system in FIG. 1.
Figure 3:
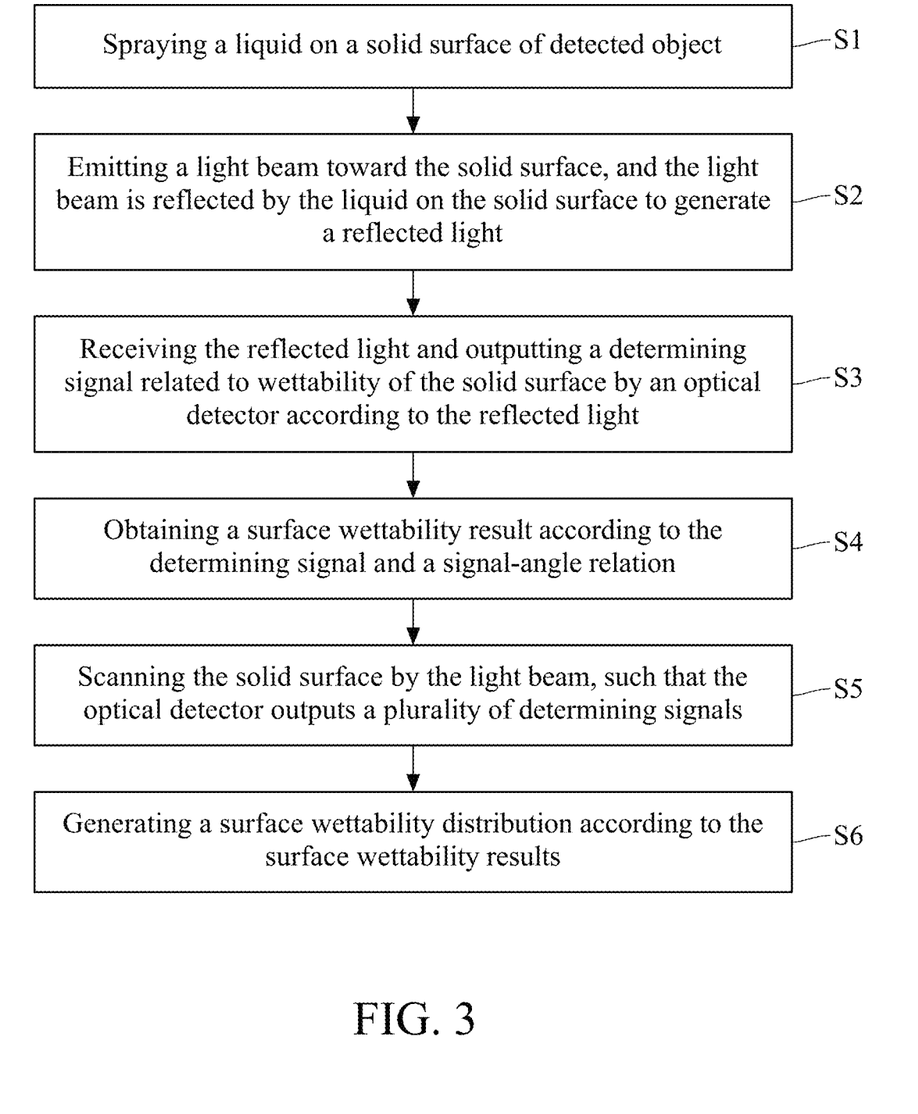
FIG. 3 is a flow chart showing a solid surface wettability determination method according to one embodiment of the present disclosure.

The following is an illustration of a solid surface wettability determination method according to one embodiment of the present disclosure. Please refer to FIG. 2 and FIG. 3. FIG. 2 is a schematic view of detecting an object by the solid surface wettability determination system in FIG. 1, and FIG. 3 is a flow chart showing a solid surface wettability determination method according to one embodiment of the present disclosure. In one embodiment, a solid surface wettability determination method includes steps S1~S5. The solid surface wettability determination method in FIG. 3 is implemented by the solid surface wettability determination system 1 in FIG. 1, while the present disclosure is not limited by the system or apparatus used to implement solid surface wettability determination method.

In the step S1, the liquid is sprayed on a solid surface 21 of a detected object 2. The detected object 2, for example but not limited to, is a shoe material, a ceramic material, a semiconductor, a polymer, a foaming material or a cloth. The solid surface 21 is an exposed outer surface of the detected object 2, and the outer surface has a certain degree of hydrophilicity or hydrophobicity. The liquid is delivered from the container 110 to the spray nozzle 120 via the pump 130 of the sprayer 10, and is evenly distributed on the solid surface 21 by the spray nozzle 120. The liquid covers the solid surface 21 in a manner depending on the wettability of the solid surface 21. When the solid surface 21 is more hydrophilic, the liquid spreads over the solid surface 21 to form a liquid film. When the solid surface 21 is less hydrophilic (more hydrophobic), the liquid clusters to form multiple droplets with similar or various sizes on the solid surface 21. For example, FIG. 2 shows the liquid spreads to form a liquid film 3 on the highly hydrophilic solid surface 21.

In the step S2, the light beam 211 is emitted to approach the solid surface 21 of the detected object 2. The light beam 211 is projected onto the liquid on the solid surface 21, and the light beam 211 is reflected by the liquid to generate a reflected light 212. As shown in FIG. 2, the light emitting component 210 of the solid surface wettability determination system 1 emits the light beam 211 toward the solid surface 21. In this embodiment, the light emitting component 210 is a laser emitter configured to emit laser beam.

The beam shaper 220 is configured to properly collimate the light beam 211 and adjust the diameter of the light beam 211. When the light beam 211 reaches the liquid on the solid surface 21, the light beam 211 is reflected by the liquid or scattered by the solid surface 21 according to the wettability of the solid surface 21. More specifically, as shown in FIG. 2, the liquid sprayed on the solid surface 21 forms a liquid film 3 when the solid surface 21 is more hydrophilic, and most amount of light in the light beam 211 is reflected by the liquid film 3. The liquid sprayed on the solid surface 21 forms multiple droplets when the solid surface 21 is more hydrophobic, and most amount of light in the light beam 211 is scattered by the solid surface 21.

In the step S3, the reflected light 212 is received by the optical detector 30, the optical detector 30 outputs a determining signal according to the reflected light 212, and the determining signal is related to the wettability of the solid surface 21. As shown in FIG. 2, the optical detector 30 and the light emission device 20 are disposed opposite to each other with respect to a normal line of the solid surface 21. The optical detector 30 can receive the reflected light 212, and then generate signal according to the intensity of reflected light 212. Specifically, as to hydrophilic solid surface 21, the light beam 211 is mostly reflected by the liquid film 3 to generate the reflected light 212 with high intensity, such that the optical detector 30 outputs signal with higher intensity; as to hydrophobic solid surface 21, the light beam 211 is mostly scattered by the solid surface 21 to generate the reflected light 212 with low intensity, such that the optical detector 30 outputs signal with lower intensity.

Figure 4:
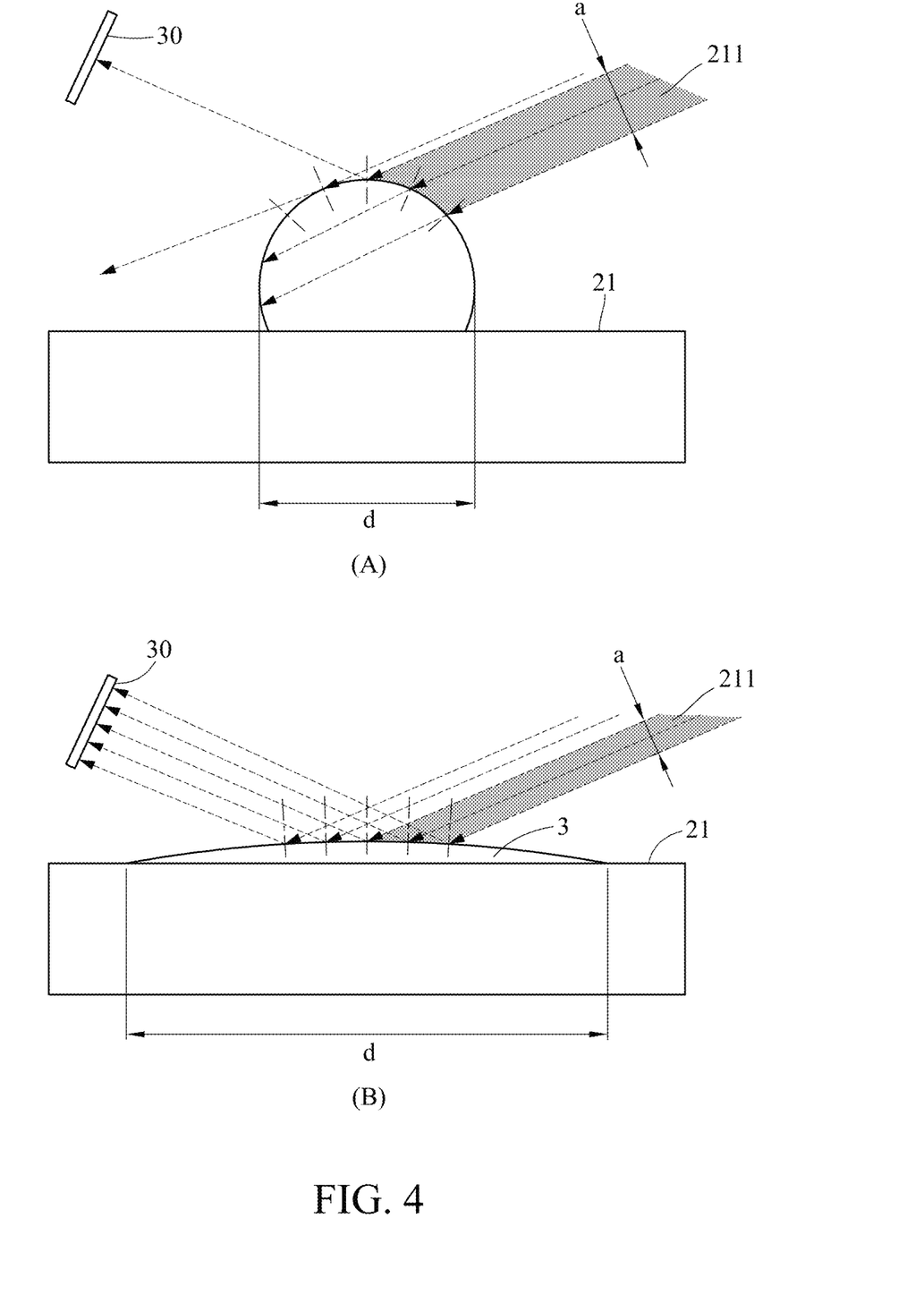
FIG. 4 is a schematic view showing theory of the solid surface wettability determination method according to one embodiment of the present disclosure.

The scattering of the light beam 211 by the liquid, more specifically the liquid surface, on the solid surface 21 can be further explained. FIG. 4 is a schematic view showing theory of the solid surface wettability determination method according to one embodiment of the present disclosure. As shown in FIG. 4-(A), when the angle of incident light is determined, the liquid on a hydrophobic surface (liquid droplet) contributes a smaller cross-section for light reflection, such that the optical detector 30 can receive the reflected light signal with low intensity. On the contrary, as shown in FIG. 4-(B), the liquid on a hydrophilic surface (liquid film 3) contributes a larger cross-section for light reflection, such that the optical detector 30 can receive the reflected light signal with high intensity.

Moreover, as shown in FIG. 4, in this embodiment, when a diameter of the light beam 211 is a, an average diameter of a droplet of the liquid formed on the solid surface 21 is d, and the following condition is satisfied: d/a>0.25. Therefore, it is helpful to ensure that the entire amount of light beam 211 can reach the liquid so as to prevent the light beam 211 from being reflected by the solid surface 21, thereby achieving high detectability for solid surface wettability determination.

Any detector capable of receiving light and converting optical signal (light intensity) into electric signal (determining signal) for outputting can be considered as the optical detector 30 in this embodiment, and the output determining signal can be in a form of electric current, voltage, thermal energy or like physical quantity. For example, either a photo-thermal detector or a photoelectric detector can be considered as the optical detector 30.

In this embodiment, the polarizer 230 is configured to modulate the light beam 211 to change the light beam 211 into polarized light. The analyzer 40 and the optical lens 50 are configured to focus the reflected light 212, which is also a polarized light, on the optical detector 30. When the liquid film is on the solid surface 21, the optical detector 30 receives the reflected light 212 with higher intensity; when the liquid droplets are on the solid surface 21, the optical detector 30 receives the reflected light 212 with lower intensity. Therefore, it is favorable for detecting the liquid on the solid surface 21 is either liquid film or liquid droplets, as well as providing high detectability in wettability determination.

In this embodiment, the optical detector 30 and the light emission device 20 are disposed opposite to each other with respect to a normal line of the solid surface 21, and the angle between the optical detector 30 and a normal line N of the solid surface 21 is the same as the angle between the light emission device 20 and the normal line N of the solid surface 21. In detail, the light beam 211 generated by the light emitting component 210 of the light emission device 20 has an angle θ1 relative to the normal line N of the solid surface 21, the reflected light 212 generated by reflection of the light beam 211 on the liquid film 3 has an angle θ2 relative to the normal line N, and the angle θ1 equal to the angle θ2. Therefore, it is favorable for the optical detector 30 only receiving the reflected light 212 so as to prevent the influence of scattered light on the solid surface wettability determination.

In the step S4, a surface wettability result is obtained according to the determining signal and a signal-angle relation. In detail, the determining signal is applied to a database to obtain a surface wettability result corresponding to a specific position on the solid surface 21. Said surface wettability result can be output by an electronic device (not shown in the drawings). Furthermore, the surface wettability result can be a message or an image representing "hydrophilic" or "hydrophobic", or a quantitative value indicating the degree of wettability.

Figure 5:
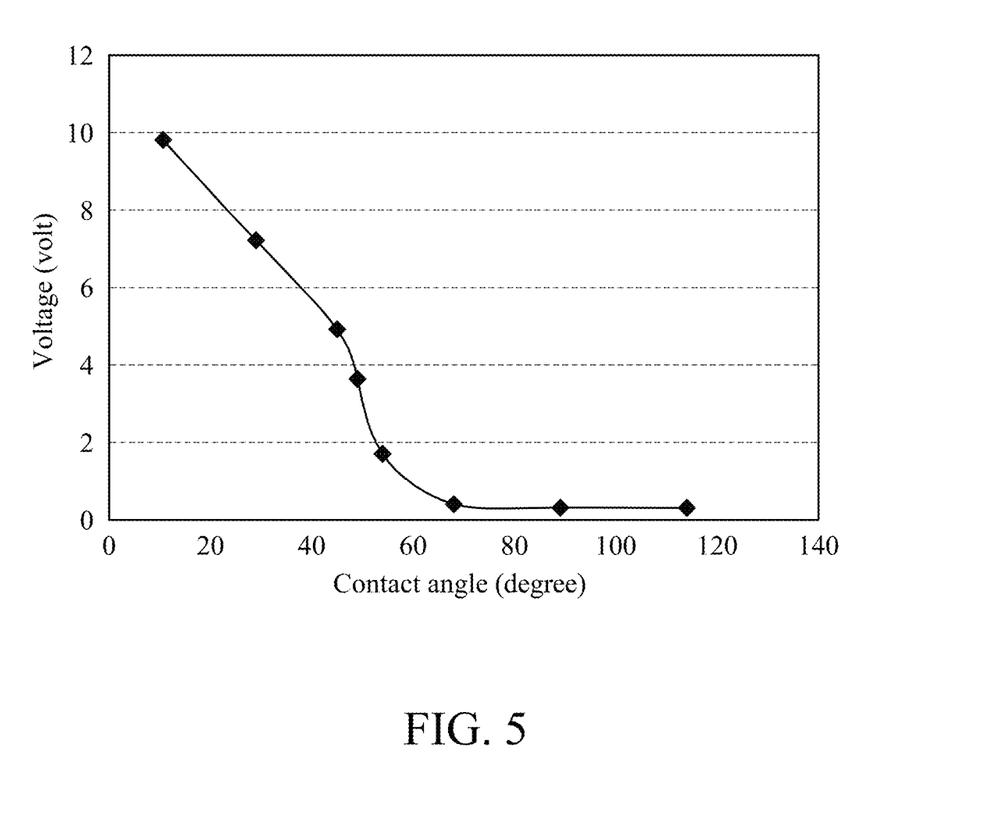
FIG. 5 is a graph showing a relationship between reference signal and contact angle.

The database can be created in advance, and the database, for example, is stored in a storage medium of computer. The database includes a plurality of reference signals and a plurality of contact angles, and the contact angles are angles of a liquid on the detected surface. The database further includes the signal-angle relation which is a relationship between the reference signals and respectively corresponding contact angles. FIG. 5 is a graph showing a relationship between reference signal and contact angle, and the reference signal is in a form of voltage for example.

The following is an exemplary method of establishing the signal-angle relation. A sample, which is made of the same material as the detected object 2, is cut into pieces, and the surface of each piece is modified by ultraviolet light or plasma to have different degree of wettability. The liquid is sprayed on the pieces, and the contact angle of the liquid on each piece is measured by an optical camera, thus obtaining the degree of surface wettability of each piece. Then, the pieces are detected by the solid surface wettability determination method disclosed in the present disclosure so as to obtain signals corresponding to the surface wettability of respective pieces, and these signals are considered as reference signals. The reference signals and the contact angles are analyzed by regression to establish a curve representing the signal-angle relation. The curve specifically shows a relationship between the wettability of the solid surface 21 and the determining signal obtained in the step S3. It is noted that the present disclosure is not limited by the curve representing the signal-angle relation. In some other embodiments, a data sheet or a chart can be used to represent the signal-angle relation.

Figure 6:
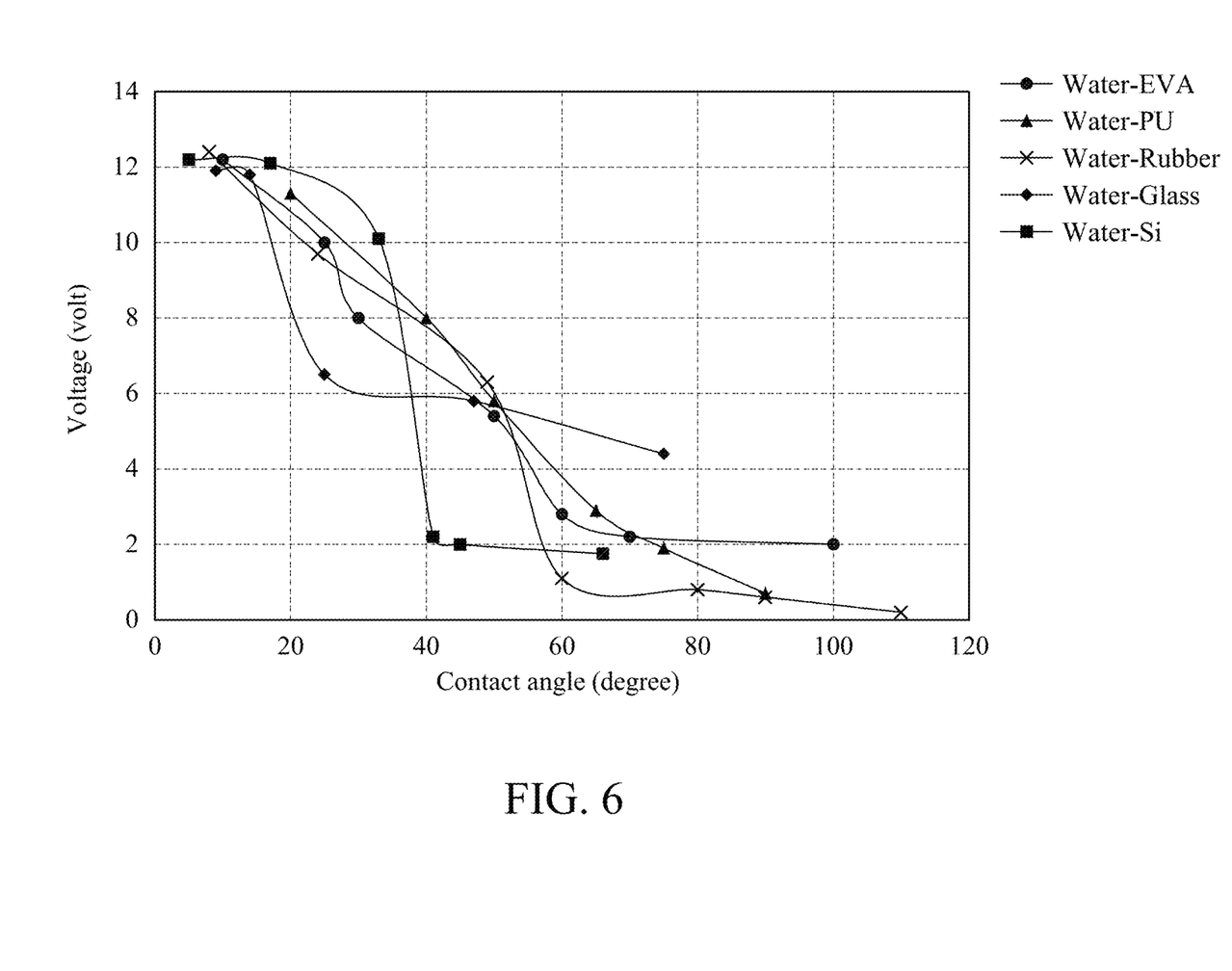
FIG. 6 is a graph showing multiple curves representing signal-angle relations.

The signal-angle relation may correspond to a liquid with specific type on a detected surface an object with specific material. For example, the curve in FIG. 5 represents a signal-angle relation of aqueous alcohol on Ethylene-vinyl acetate copolymer (EVA), while the database can store multiple curves representing different signal-angle relations. FIG. 6 is a graph showing multiple curves representing signal-angle relations. The database, which is created in advance, may store signal-angle relations which correspond to different types of liquid or different materials of detected object. FIG. 6 shows a curve (Water-EVA) representing a signal-angle relation of water on EVA shoe sole, a curve (Water-PU) representing a signal-angle relation of water on polyurethane (PU) shoe sole, a curve (Water-Rubber) representing a signal-angle relation of water on rubber shoe sole, a curve (Water-Glass) representing a signal-angle relation of water on glass substrate, and a curve (Water-Si) representing a signal-angle relation of water on silicon wafer. These signal-angle relations can be pre-stored in the solid surface wettability determination system 1 as the database. Before the surface wettability determination system 1 works (before the step S1) or after the determining signal is obtained (after the step S4), a suitable signal-angle relation can be selected according to the type of liquid used in the measurement and the material of the detected object 2. Then, the determining signal can be applied to the selected signal-angle relation so as to obtain the contact angle of the liquid on the solid surface 21. The signal-angle relation can be selected by manual operation or automatic operation. In the case of manual operation, an operator inputs the type of liquid and the material of object used in this solid surface wettability determination procedure. In the case of automatic operation, a sensor (not shown in the drawings) determines the type of liquid and the material of object, and outputs a relevant information to the solid surface wettability determination system 1; then, the solid surface wettability determination system 1 automatically select suitable signal-angle relation according to the relevant information.

According to one embodiment of the present disclosure, the solid surface wettability determination system 1 further includes a computing unit. The computing unit, for example, is a calculator or a processing chip in the solid surface wettability determination system 1. The computing unit is communicated with the optical detector 30 for receiving the determining signal from the optical detector. The aforementioned database can be stored in the computing unit, or the computing unit captures the database from external storage medium. The computing unit determines the wettability of the solid surface 21 by applying the determining signal to the database; that is, the step S4 is implemented by the computing unit.

After the step S4 is finished, a surface wettability result corresponding to a single position on the solid surface 21 is obtained. In this embodiment, the solid surface wettability determination method further includes a step of determining the wettability of some other positions or even all positions on the solid surface 21. The following is an illustration of solid surface wettability determination for all positions on the solid surface 21.

In the step S5, the solid surface 21 is scanned by the light beam 211, such that the optical detector 30 outputs a plurality of determining signals corresponding to different positions on the solid surface 21. As shown in FIG. 2, the light emission device 20 is moved relative to the detected object 2 along a direction D orthogonal to the normal line N of the solid surface 21 to detect all positions on the solid surface 21. The optical detector 30 receives reflected light generated by the liquid at different positions on the solid surface 21, thereby outputting multiple determining signals. The determining signals correspond to the surface wettability at respective positions. Referring to FIG. 2, when the light beam 211 scans the solid surface 21 to pass through a first position P1, part of the liquid film 3 at the first position P1 reflects the light beam 211 to generate the reflected light 212, and the optical detector 30 receives the reflected light 212 to output a determining signal corresponding to the surface wettability at first position P1. When the light beam 211 scans the solid surface 21 to pass through a second position P2, another part of the liquid film 3 at the second position P2 reflects the light beam 211 to generate the reflected light 212, and the optical detector 30 receives the reflected light 212 to output another determining signal corresponding to the surface wettability at second position P2.

Moreover, when the light beam 211 approaches the solid surface 21, the sprayer 10 continuously sprays liquid on the solid surface 21. In the step S5, the sprayer 10 continuously sprays liquid to keep the liquid film 3 complete or the droplets sufficient on the solid surface 21, thereby ensuring the reliability of solid surface wettability determination. It is noted that the present disclosure is not limited by continuous liquid spray. In some other embodiment, the sprayer 10 stops spraying liquid in the step S5.

The aforementioned surface wettability result can be the contact angle of the liquid on the solid surface 21.

According to the type of liquid and the material of object, the solid surface wettability determination system 1 can select corresponding signal-angle relation from the database, such as one of the curves in FIG. 6. Take a condition that water is sprayed on EVA shoe sole as an example. The system can select the curve "Water-EVA" as the signal-angle relation used in this measurement. The determining signals obtained in the step S5 are applied to the selected signal-angle relation so as to obtain the contact angle of the liquid on the solid surface 21.

Although the solid surface wettability determination system 1 can quantify surface wettability by parameters such as light intensity or voltage, most users in this field are still used to describe the degree of wettability in terms of contact angle; therefore, the surface wettability results are expressed by contact angle, which is helpful for efficient product quality management.

Figure 7:
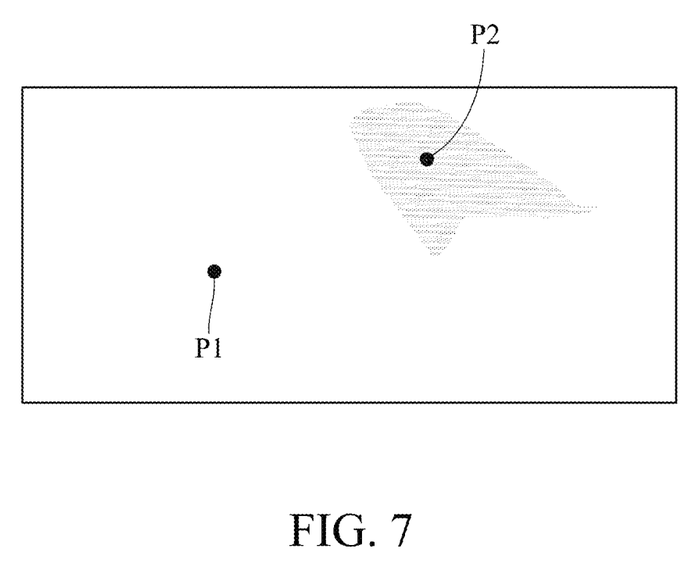
FIG. 7 is a schematic view of surface wettability distribution according to one embodiment of the present disclosure.

The solid surface wettability determination may further include a step S6. In the step S6, a surface wettability distribution is generated according to the surface wettability results corresponding to different positions on the solid surface 21. FIG. 7 is a schematic view of surface wettability distribution according to one embodiment of the present disclosure.

The output determining signals in the step S5 are applied to the signal-angle relation in the database to obtain the surface wettability results corresponding to respective positions on the solid surface 21, The surface wettability results are represented by a distributing topographic graph. In detail, after the step S5 is finished, the optical detector 30 transmits the determining signals to a computer (not shown in the drawings). The computer includes image processing software for receiving the determining signals and converting the determining signals into an image on a display (not shown in the drawings). According to the signal strength of each determining signal corresponding to respective position on the solid surface 21, color distribution or gray scale distribution is shown in the distributing topographic graph (surface wettability distribution). Referring to FIG. 2, since a region of the solid surface 21 where the first position P1 is located is more hydrophilic, the optical detector 30 outputs determining signals with higher intensity, and this region is white in the distributing topographic graph. Similarly, since another region of the solid surface 21 where the second position P2 is located is more hydrophobic, the optical detector 30 outputs determining signals with lower intensity, and this region is gray in the distributing topographic graph. Thus, a user quickly finds out regions of the solid surface 21 with abnormal surface wettability according to the surface wettability distribution, thereby determining whether the detected object 2 is defective.

It is noted that the present disclosure is not limited by the representation of surface wettability results. In some other embodiments, the surface wettability results are represented by a chart or a data sheet.

Furthermore, as shown in FIG. 2, according to one embodiment of the present disclosure, the light beam 211 approaches the solid surface 21 at an angle θ1 of incidence of 30.0 degrees to 85.0 degrees. A proper range of the angle θ1 is favorable for enhancing the detectability of the solid surface wettability determination system 1. Please refer to the following TABLE 1, which shows the angle θ1 of incidence and corresponding detectability. In one embodiment, both the determining signal and the reference signal are in a form of voltage, and the definition of detectability is a ratio of the voltage, corresponding to hydrophilic region (liquid film), to the voltage corresponding to hydrophobic region (liquid droplets). That is, the following condition is satisfied: (detectability)=(output voltage according to reflected light at hydrophilic region)/(output voltage according to reflected light at hydrophobic region).

TABLE 1

| | Angle of incidence (degree) | | | | | | |
| --- | --- | --- | --- | --- | --- | --- | --- |
| | 30.0 | 40.0 | 50.0 | 60.0 | 70.0 | 80.0 | 85.0 |
| Detectability | 4.3 | 5.5 | 5.4 | 8.4 | 17.5 | 38.3 | 30.1 |

In TABLE 1, when the angle θ1 is between 30.0 degrees and 85.0 degrees, the voltage corresponding to hydrophilic region is apparently greater than the voltage corresponding to hydrophobic region; more specifically, the voltage corresponding to hydrophilic region is four times greater than the voltage corresponding to hydrophobic region. Thus, the solid surface wettability determination system of the present disclosure is capable of accurately distinguishing higher hydrophilic region and lower hydrophilic region on the solid surface 21 in order to determine the surface wettability at different regions of the solid surface 21; that is, the solid surface wettability determination system is capable of accurately identifying the difference between liquid film and liquid droplets.

When the angle θ1 is less than 30.0 degrees, the detectability of the solid surface wettability determination system 1 is decreased, which may cause that the boundary between hydrophilic region and hydrophobic region cannot be clearly identified. When the angle θ1 is greater than or equal to 90.0 degrees, the optical detector 30 cannot receive sufficient amount of reflected light 212. Thus, it is favorable for identifying the difference between liquid film and liquid droplets as the angle θ1 is less than 90.0 degrees, and is 30.0 degrees to 85.0 degrees in some other embodiments.

The numerical range of the angle θ1 mentioned above relates to the polarized reflection of light from the liquid. When light reaches the liquid-to-gas interface at an angle of incidence of less than 30.0 degrees, the reflectivity caused by liquid film or liquid droplet is less than 3%. When the angle of incidence is greater than 30.0 degrees, the reflectivity increases significantly as with the incident angle of incidence increases.

According to the present disclosure, the liquid is sprayed on the detected surface of the detected object, and the light beam is reflected by the liquid on the detected surface to generate the reflected light. The optical detector receives the reflected light and outputs the determining signal, and the surface wettability is determined according to the determining signal. For example, a determining signal with higher intensity indicates hydrophilic surface, and another determining signal with lower intensity indicates hydrophobic (low hydrophilic) surface. In comparison with conventional solid surface wettability determination techniques, the solid surface wettability determination system of the present disclosure achieves wettability determination on large surface, such that the present disclosure is more applicable to production line. Moreover, the reflected light received by the solid surface wettability determination system is generated by the reflection of light, and such reflection results from the liquid on the detected surface, such that the solid surface wettability determination is not influenced by the shape of detected object, the roughness thereof, the color thereof, or the material thereof.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A solid surface wettability determination method, comprising:
spraying a liquid on a solid surface of an object;
projecting a light beam toward the solid surface, wherein the light beam is reflected by the liquid on the solid surface to generate a reflected light;
receiving the reflected light by an optical detector, and outputting a determining signal related to a wettability of the solid surface according to the reflected light;
selecting a corresponding signal-angle relation from a database according to type of the liquid and material of the object; and
obtaining a contact angle of the liquid on the solid surface by applying the determining signal to the corresponding signal-angle relation.

2. The solid surface wettability determination method of claim 1, wherein the light beam approaches the solid surface at an angle of incidence less than 90.0 degrees.

3. The solid surface wettability determination method of claim 2, wherein the light beam approaches the solid surface at the angle of incidence of 30.0 degrees to 85.0 degrees.

4. The solid surface wettability determination method of claim 1, wherein the corresponding signal-angle relation comprises a relationship between a plurality of reference signals in the database and a plurality of known contact angles of the liquid on the solid surface.

5. The solid surface wettability determination method of claim 1, further comprising:
scanning the solid surface by the light beam, such that the optical detector outputs plurality of the determining signals corresponding to different positions on the solid surface;
obtaining at least one surface wettability result according to the determining signals corresponding to different positions on the solid surface; and
generating a surface wettability distribution according to the at least one surface wettability result.

6. The solid surface wettability determination method of claim 1, wherein the liquid covers the solid surface when the light beam approaches the solid surface.

7. The solid surface wettability determination method of claim 1, wherein the determining signal is in a form of voltage.

8. The solid surface wettability determination method of claim 1, wherein a diameter of the light beam is a, an average diameter of a droplet of the liquid formed on the surface is d, and the following condition is satisfied:

$$d/a > 0.25.$$

9. The solid surface wettability determination method of claim 1, wherein type of the liquid is water, and material of the object is selected from Ethylene-vinyl acetate copolymer, polyurethane, rubber, glass and silicon.

10. The solid surface wettability determination method of claim 1, further comprising:
providing a solid surface wettability determination system, comprising:
a sprayer provided to spray the liquid on the solid surface of the object;
a light emission device provided to emit the light beam and project the light beam toward the solid surface; and
the optical detector provided to receive the reflected light;
wherein the optical detector and the light emission device are disposed opposite to each other with respect to a normal line of the solid surface, and angle between the optical detector and the normal line of the solid surface is equal to angle between the light emission device and the normal line of the solid surface.

* * * * *